Nov. 5, 1935.  J. J. GOUGH  2,019,780
ELECTRIC HEATING UNIT
Filed Oct. 24, 1934  2 Sheets-Sheet 1
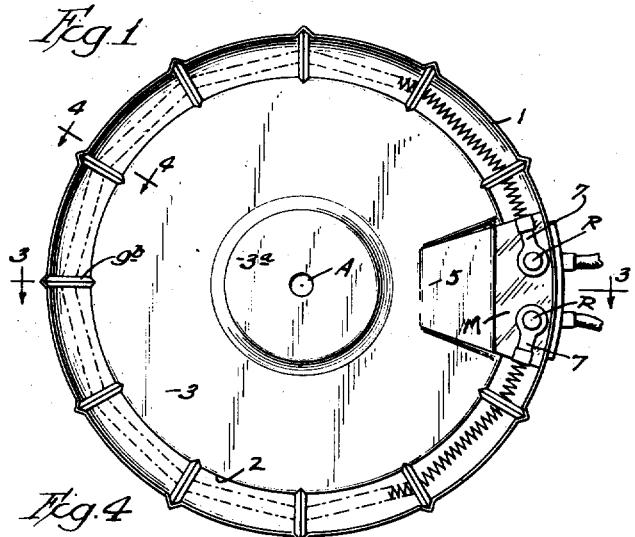
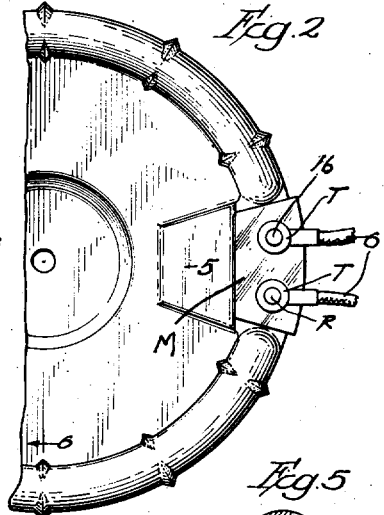
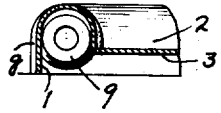
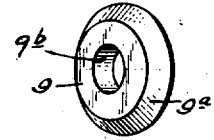
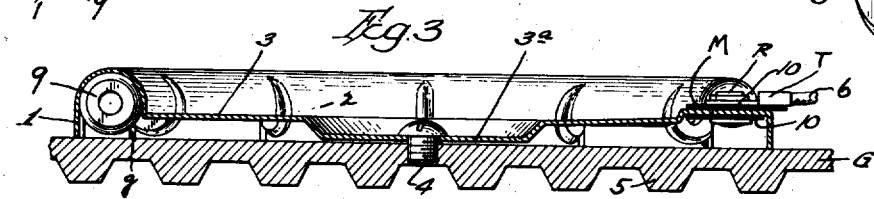
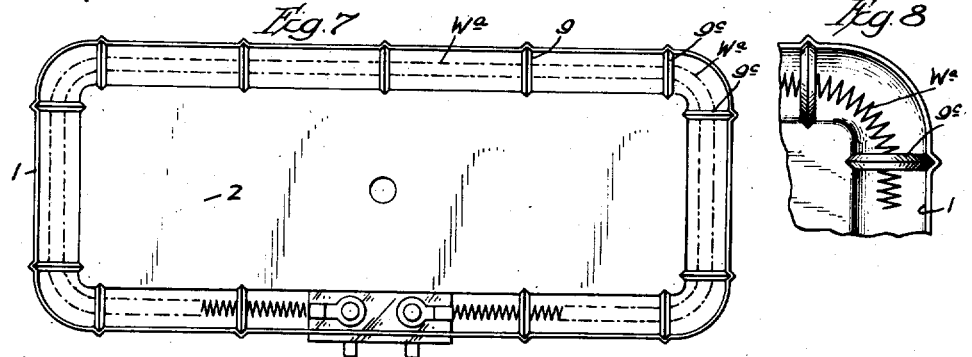
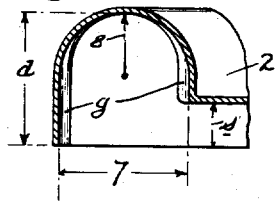
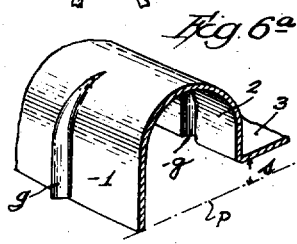
Inventor:
James J. Gough
by Albert Scheith
Attorney

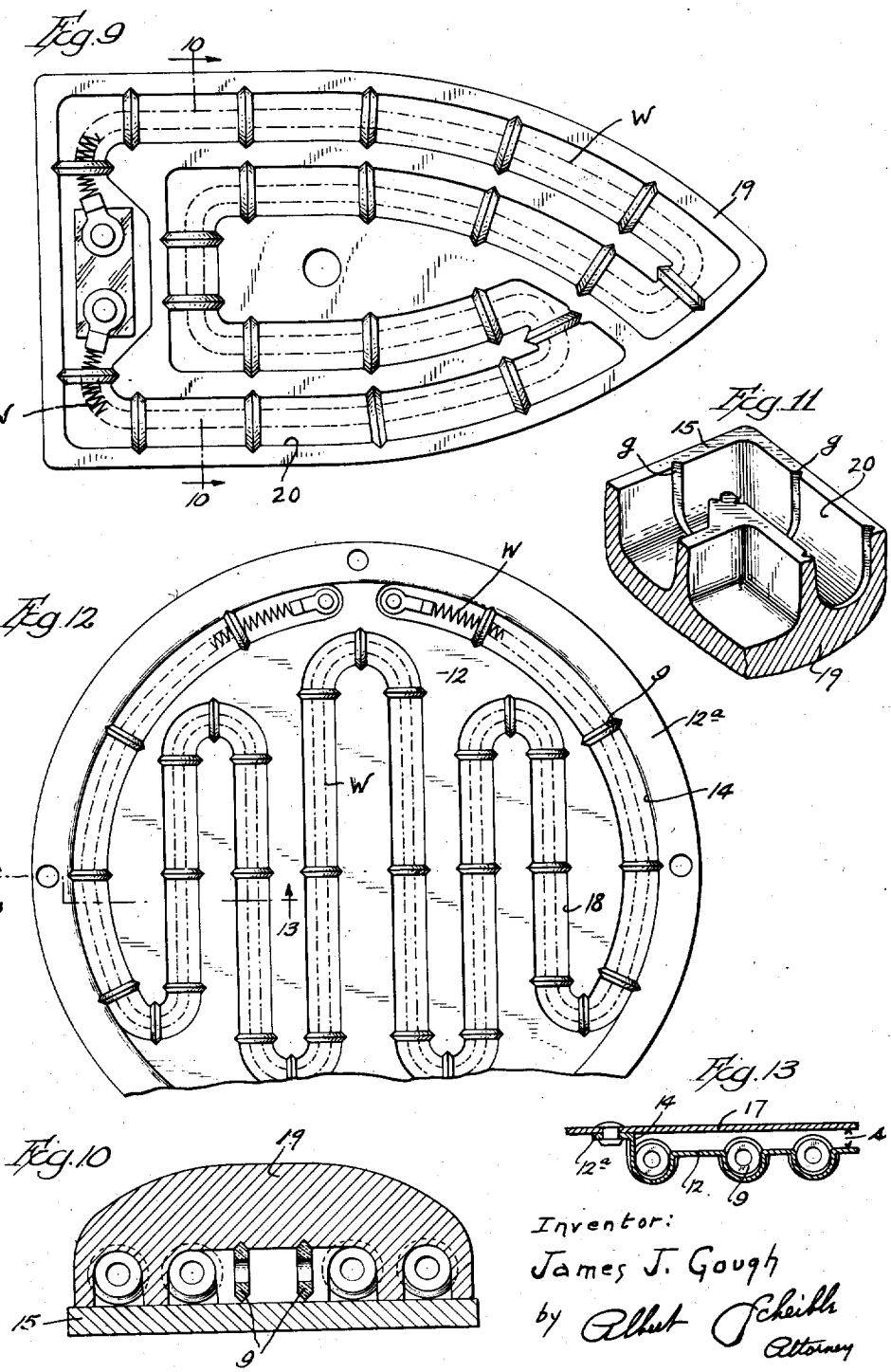

Patented Nov. 5, 1935

2,019,780

UNITED STATES PATENT OFFICE 2,019,780

ELECTRIC HEATING UNIT

James J. Gough, Chicago, Ill., assignor to Chicago Electric Manufacturing Company, Chicago, Ill., a corporation of Illinois Application October 24, 1934, Serial No. 749,802

11 Claims. (Cl. 219—19)

My invention relates to an electric heating unit for use in an appliance in which heat is to be imparted to a generally flat member. Generally speaking, my invention aims to overcome numerous shortcomings of some types of the electric heating units now employed in electrically heated household appliances, as for example electric waffle irons, sandwich toasters, coffee percolators and flat irons.

In such appliances, the electric heating unit is usually constructed separately from the plate-like appliance portion which is to be heated by it, and such heating units have commonly been of three types:

(1) One type consists of a sheet of mica having a high-resistance wire wound on it, the said sheet having notches in its opposite edges in which the wire is seated, so as to keep the consecutive turns of the wire from sliding toward each other. This wire-wound mica sheet then has a sheet of asbestos, or another sheet of mica, interposed between it and the metal plate which is to be heated; and to deter an undue radiation of heat from the opposite face of the sheet, another insulating sheet must be interposed between the wire on a latter face and a heat-confining member, when the latter member is cheaply formed of metal.

In practice, the brittleness of mica frequently leads to breakage at the factory and a deleterious cracking of the mica may also occur when the heating unit is in use. In addition, impurities in the mica sometimes also short-circuit consecutive turns of the wire so that the resulting excessive heating of a small portion of the wire "burns out" the heating element. Moreover, the assembler must tension the wire sufficiently to bend it sharply through the edge grooves or notches in the mica and to make it lie flat on the mica sheet, in doing which the wire may easily be overstrained at one or more of the bends so that repeated heating and cooling ruptures the wire.

(2) In a second type, the high-resistance wire is spirally coiled and the coiled wire is then bent to a zigzag formation and laid into a correspondingly formed groove in a block of porcelain or other insulating material; the groove being open toward the plate or other appliance portion which is to be heated.

This type has the disadvantage that a sheet of insulating material must be interposed between the mouth of the groove and the plate which is to be heated, to avoid having the wire contact with the said plate when the appliance is inverted; or the groove may be considerably deeper than the diameter of the wire coil and the insulating block may have fingers extending into the groove to hold the coil away from the said plate, thereby increasing the cost of this block and the assembly labor. In either case, the fragility of porcelain or other commonly used insulating materials frequently leads to breakages, both at the appliance factory and when the completed appliance is roughly handled either in transit or by the user.

(3) In a third type, a zigzagged coil of high-resistance wire is entirely embedded in a cement, in which case no inspector can see whether or not originally spaced portions of the coil have bent into contact with each other. This type has the disadvantage that all of the heat generated in the wire must first pass through the cement, so that the adjacent metal plate heats up slowly; and the same is true to a lesser extent with the grooved insulating blocks of the above mentioned second type. Moreover, molded materials suitable for this third type are usually more fragile than porcelain, thereby leading to still more breakages both at the factory and thereafter.

To overcome the above recited shortcomings and disadvantages of the heretofore customary plate-heating units, my present invention aims to provide a heating unit in which the coiled wire is supported only at widely spaced points by insulators, and in which these insulators are supported and spaced by a cheaply formed metal fastened directly to the plate which is to be heated, without requiring any insulation sheet to be interposed therebetween.

Moreover, my invention aims to utilize the resiliency of the usual nickel-chrome high-resistance wire, namely the resiliency which this wire has when cold, for anchoring the insulators to the metal punching so that the assembled unit can be freely handled in any position without having either the insulators or the wire shift out of their former dispositions.

More particularly, my invention aims to provide a grooved metal carrier for an insulator-supported coil of wire, so constructed that this carrier, when clamped to the plate which is to be heated, will cooperate with the said plate to form a closed chamber within which the heated air can readily be distributed to plate portions not directly facing any parts of the heated coil or resistance wire.

Illustrative of the manner in which I accomplish these objects, Fig. 1 is a bottom view of a heating unit embodying my invention, with the major portion of the coiled wire merely indicated in dotted outline.

Fig. 2 is a fragmentary plan view of the same.

Fig. 3 is an enlarged section diametric of the same unit (as along the line 3—3 of Fig. 1) including a portion of the upper grid of a waffle iron, to which grid this unit is fastened.

Fig. 4 is a section taken along the line 4—4 of Fig. 1, drawn on the same scale as Fig. 3.

Fig. 5 is a still more enlarged perspective view of one of the insulators which supports the coiled heating wire.

Fig. 6 is an enlarged section taken along the line 6—6 of Fig. 2 through the metal carrier alone.

Fig. 6a is a similarly enlarged perspective view of a portion of the metal carrier.

Fig. 7 is an interior view of a heating unit suitable for attachment to the rectangular heating plate of a sandwich toaster, with the major portion of the coiled wire merely indicated in dotted outline.

Fig. 8 is an enlargement of the upper right-hand corner of Fig. 7, with the corresponding part of the coiled wire shown diagrammatically in full lines.

Fig. 9 is a bottom view of my heating unit when constructed with a cast iron carrier to serve also for weighting the sole of a flat iron.

Fig. 10 is a section taken along the line 10—10 of Fig. 1, with the heating wire omitted.

Fig. 11 is an enlarged perspective view of a rear corner portion of the metal carrier of Fig. 9.

Fig. 12 is a fragmentary plan view of my heating unit when constructed for use as a hot plate for directly heating a coffee-pot, tea kettle or the like.

Fig. 13 is a section taken along the line 13—13 of Fig. 12, with the heating wire omitted.

When my electric heating unit is to be used for downwardly heating a circular plate-like member, such as the waffle iron grid G of Fig. 3, I desirably employ a carrier metal constructed from a disk of sheet metal which has its peripheral portion formed to afford a downwardly open annular trough of which the lower portion of the outer wall forms a tubular flange 1 at the periphery of the carrier.

The inner trough wall 2 is preferably of less height than the said outer wall, so that the portion 3 of the punching enclosed by this inner wall is offset (as by a distance s) from the plane P (Fig. 6a) of the free edge of the outer trough wall, thereby leaving an air space between the said inner portion 3 and the face of the grid G to which the carrier is fastened by the screw 4 of Fig. 3. However, to prevent an undue distorting of the said inner portion of the carrier in case the said screw was screwed too far, I desirably emboss the central part 3a to within a quite short distance from the said plane.

While forming the said trough, I also form spaced pairs of opposed upright grooves g in both riser walls of the trough, which grooves desirably are of a fairly sharp-angled V-section. In a circular trough, these pairs of opposed grooves desirably are equally spaced, but are omitted at one edge portion of the carrier, which edge portion 5 (Fig. 1) is flattened to serve as a support for terminals T respectively on the ends of the two circuit wires 6 which are to be fastened by rivets R to terminals 10 of the heating wire. Moreover, I form my carrier so that the spread 7 between the bottoms of any two opposed grooves is approximately twice the radius 8 (Fig. 6) of the trough bottom, and make the outer trough wall of such height that the extreme trough depth $d$ is somewhat greater than the said spread 7 of the bottoms of any two opposed grooves.

Next I provide centrally perforated insulators 9 each having its peripheral portion 9a of a V-section adapted to fit into one of the said grooves g and each being of an exterior diameter substantially corresponding to the said groove-bottom spread 7. These insulators are preferably counterparts and can be cheaply made of lava, and in practice each such insulator may be of a maximum thickness considerably less than the diameter of its bore 9b.

This insulator bore diameter desirably is considerably larger than the outside diameter of the coil of resistance wire W, so that the (initially axially straight) wire coil can easily be slid through all of the insulators (which correspond in number to the said pairs of opposed grooves) when only one of the coil terminals R is already fastened to an end of the wire coil, after which the companion terminal is fastened to the other coil end.

Moreover, the length of the wire coil W with which I start is such that if it were laid loosely in the trough bottom to span the space between the coil terminals, these coil terminals 10 would not reach both of the rivets R which connect these coil terminals to the circuit terminals T, so that the wire coil must be considerably stretched before the said rivet connections can both be made. During the assembling, the interposed carrier portion 5 is insulated from each of the adjacent terminals by a mica sheet M, as shown in Fig. 3.

After the insulators have thus been strung upon the terminal-equipped wire coil, the assembler slides each insulator between a pair of the opposed grooves g, preferably starting with the middle insulator (9b in Fig. 1), and stretches the coil portions between consecutive insulators step-wise alternately in opposite directions from the midlength of the coil. Even an inexperienced assembler can quickly learn the extent of stretching needed between each two insulators to equalize the tension throughout the coil.

With ample play between the wire coil and the bores of the insulators, the assembler also can readily flex any part of the coil radially outward of the carrier so as to slide that part in either direction (longitudinally of the coil) through the insulator, so as to readjust and equalize the stretching of the numerous insulator-spaced parts of the coil. When the coil terminals are then anchored by the rivets R, the coil (if of a suitably selected initial length) is tensioned so that it bears only against the edges of the insulator bores which are nearest the axis A of the carrier.

Since this tensioning causes the wire coil W to bear against sharp end portions of each insulator bore, this coil no longer can slide in either direction through an insulator; and when the wire coil is considerably smaller in diameter than the minimum width of the trough, all portions of this coil will still be so freely spaced from the trough walls that the coil will not touch these walls even though the coil parts between consecutive insulators are tensioned so as to have substantially straight axes.

Moreover, the just described tensioning of the wire coil also causes the resiliency of this coil to press each insulator into the corresponding groove in the inner trough wall 2, thereby clamping the insulators against this wall. Consequently, the assembled unit can be freely inverted from its position of Fig. 1 and handled in this or any other position without disturbing the relative position of its elements.

To secure compactness when using such a peripherally flanged carrier member while also insuring a firm socketing of each insulator in the corresponding grooves, I desirably form each groove (as in Figs. 6 and 6a) so that its groove bottom merges into the bottom of the bottom of the trough which is widened by that groove.

When the assembled unit is then fastened to the part which is to be heated by it—as for example by a single screw 4 threaded into the waffle-iron grid G of Fig. 3, the tightening of this screw draws the free edge of the outer trough wall 1 firmly against the adjacent face of the grid; and if the punching should be somewhat warped, the offsetting of its central portion 3a by the initially provided spacing from the plane P of the said outer trough wall edge permits the main annular portion 3 of the punching to flex until the said wall edge seats completely on the grid. Thus attached, my metal carrier coacts with the adjacent part of the grid to afford a closed air chamber within which the heat from the wire coil can readily be radiated to the said grid.

Since the thickness of each lava insulator can be a quite minor fraction of the distance between consecutive insulators, I thus permit a direct radiation of heat from almost the entire length of the wire coil to the grid or other member which is to be heated by it. Consequently, I avoid the retardation of the heating due to the use of insulating sheets between the heating wire and the plate which is to be heated, or the use of a molded insulator in which the wire is embedded. Moreover, since my carrier houses both the heating wire and the insulators, neither of the latter can be damaged by rough handling, so that I greatly reduce both the breakage and the need of repairs, in addition to reducing the initial cost.

In practice, the contour of my unit can readily be varied according to that of the plate or other element which is to be heated by it, even when the insulator-housing trough is generally annular. For example, if the plate which is to be heated is rectangular, as in a sandwich toaster, my carrier may be correspondingly shaped, as shown in Fig. 7. In that case, I preferably dispose two insulators 9c relatively close to each other at each corner portion of the trough in the carrier, so that the corner coil portions Wa still will be freely spaced from the inner trough wall, as shown in Fig. 8.

Moreover, it is not essential to my invention that the trough in the carrier be of a simple annular shape, as in Figs. 1 and 7, since the shaping of the axis of the trough can be varied according to the desired distribution of the heat. Nor is it essential that the trough be adjacent to the periphery of the carrier, since the trough may have variously formed bends so disposed as to house a relatively greater length of the heating wire within a given area.

For example, Fig. 12 shows an embodiment of my invention in which the central and major portion of the carrier is a generally flat sheet metal disk 11, formed with a sinuous trough 12 which has pairs of opposed portions widened for receiving insulators 9, and in which the carrier has a flat rim portion 12a surrounding its troughed central part. This rim portion may be offset from the plane of the mouth end of the trough as shown in Fig. 13, so as to cooperate with the heated plate 17 in forming a hot-air chamber within which the wire coil is entirely housed.

On the other hand, the face parts of a carrier which extend both between various portions of the mouth end of the trough and outside the trough may all be in a common plane, and the carrier may be a metal casting. Thus, Figs. 9, 10 and 11 show portions of an electric flat iron in which the sole plate 15 has a cast-iron block 19 seated on it to add weight to the sole plate, this block having a sinuous trough 20 formed in its lower face and having counterpart pairs of upright trough-widening grooves g for slidably receiving the insulators 9 which support the wire W in the trough. In this case, the lower face of the combined carrier and weight 19 may be entirely flat, so as to seat flatwise on the upper face of the sole plate, thereby enabling heat stored in the carrier to be conducted more speedily to the sole plate than it would be through an air space.

Many other changes also might obviously be made without departing either from the spirit of my invention or from the appended claims.

I claim as my invention:

1. An electric heating unit for an electrically heated appliance, comprising a generally horizontal carrier member presenting a continuous trough having an arcuate axis disposed in a horizontal plane; the carrier being provided in its side walls with spaced pairs of opposed upright grooves; counterpart insulators disposed in the said trough, each insulator being of larger diameter than the width of the trough and having peripheral portions thereof slidably fitted into a pair of opposed grooves and having a bore substantially coaxial with the part of the groove in which it is disposed; and a coil of high resistance wire extending consecutively through the bores of the insulators; the said coil being tensioned to press all of the insulators against the grooves in the inner wall of the trough, and the coil being freely slidable in the bores of the insulators to permit the tensioning to equalize the pressure of the insulators against the said grooves so that the said tensioning causes the said insulators and coil to remain supported by the carrier member when the latter is inverted.

2. An electric heating unit as per claim 1, in which the outer wall of the trough is taller than the inner wall thereof, and in which all parts of the carrier member radially inward of the said trough are offset away from the surface in which the free edge of the outer wall of the said trough is disposed and toward a plane tangential to the bottom of the trough.

3. An electric heating unit as per claim 1, in which the mouth end of the outer wall of the trough is spaced from the bottom of the trough by a distance greater than the diameter of the insulators and in which the carrier member includes a disk-like portion spanning the inner wall of the trough.

4. An electric heating unit as per claim 1, in which the cross-section of the bottom of the trough is an arc of substantially the same radius as that of the periphery of one of the insulators.

5. An electric heating unit for heating a flat portion of an appliance, comprising a circular sheet metal carrier formed to provide an annular trough adjacent to its periphery, the side walls of the trough being provided with spaced pairs of opposed grooves extending parallel to the axis of the circular carrier; axially bored washer-like insulators of V-edged periphery seated in the said trough and each having portions thereof slidably fitted into a pair of the said opposed grooves; and a coil of resilient high resistance wire extending consecutively through the said insulators, the said coil being of smaller diameter than the bores of the insulators and being sufficiently tensioned so that the parts of the coil disposed between consecutive insulators are substantially chordant to the longitudinal axis of the said trough.

6. A heating unit as per claim 5, in which the part of the carrier radially inward of the said trough comprises an outer annular portion offset toward the bottom of the trough from the plane of the free edge of the outer trough wall, and a central portion lying in a plane intermediate of the aforesaid plane and a face of the said annular portion.

7. A heating unit as per claim 5, in which the part of the carrier radially inward of the said trough comprises an outer annular portion offset toward the bottom of the trough from the plane of the free edge of the outer trough wall, and a central portion offset to a lesser extent in the same direction; the said central portion being centrally perforated and spaced from the said plane by a distance which is relatively short in proportion to the height of the said outer trough wall.

8. An electric heating unit for heating a flat horizontal portion of an appliance, comprising a generally horizontal carrier member provided with a trough of uniform width and depth, which trough has bends in its axis and has spaced pairs of opposed upright grooves in its side walls for effectively widening the trough at spaced points; centrally bored washer-like insulators each extending into the said trough and each having diametrically opposite portions thereof seated respectively in two opposed grooves; and a coil of high resistance wire extending consecutively through the bores of the said insulators, the said coil being freely slidable through the said bores during the assembling of the electric heating unit and being tensioned to press each insulator against the groove wall which is at the inward side of a bend in the groove near to that insulator.

9. An electric heating unit as per claim 8, in which certain of the opposed pairs of grooves are disposed at the middle of bends in the trough while other such pairs are disposed between consecutive bends.

10. An electric heating unit comprising a disk of sheet metal having the major portion of its peripheral portion formed to afford an incomplete annular trough, the side walls of the trough being provided with opposed grooves which extend parallel to the axis of the outer trough wall, the grooves constituting each pair having their axes in a common plane diametric of the outer trough wall; centrally bored washer-like insulators disposed in the said trough and each having peripheral parts thereof fitted into the grooves constituting one of the said pairs; two wire terminals fastened and insulated from the part of the disk between the ends of the incomplete annular trough; and a spiral tubular coil of high resistance wire extending through the bores of the said insulators and fastened at its ends respectively to the said wire terminals the said coil being freely slidable through the bores of the insulators during the assembling of the heating unit, and the said part of the disk being offset from adjacent portions of the disk toward a plane tangential to the bottom of the trough.

11. An electric heating unit as per claim 10, in which the said wire coil is longitudinally tensioned so as to press the insulators against the inner wall of the said trough.

JAMES J. GOUGH.